United States Patent
Zhou

(10) Patent No.: US 11,479,508 B2
(45) Date of Patent: Oct. 25, 2022

(54) SOUND INSULATING MATERIAL, SOUND INSULATING PLATE AND PARTITION STRUCTURE OF TRAIN CARRIAGE

(71) Applicant: Luyu Royal Gold Building Materials (Heyuan) Co., Ltd, Guangdong (CN)

(72) Inventor: Guofu Zhou, Guangdong (CN)

(73) Assignee: Luyu Royal Gold Building Materials (Heyuan) Co., Ltd, Heyuan (CN)

( * ) Notice: Subject to any disclaimer, the term of this patent is extended or adjusted under 35 U.S.C. 154(b) by 653 days.

(21) Appl. No.: 16/580,136

(22) Filed: Sep. 24, 2019

(65) Prior Publication Data

US 2020/0017411 A1   Jan. 16, 2020

Related U.S. Application Data

(63) Continuation of application No. PCT/CN2018/099484, filed on Aug. 9, 2018.

(30) Foreign Application Priority Data

Sep. 1, 2017 (CN) .......................... 201710781265.3

(51) Int. Cl.
| | | |
|---|---|---|
| C04B 28/26 | (2006.01) | |
| B32B 11/04 | (2006.01) | |
| B61D 17/18 | (2006.01) | |
| C04B 14/04 | (2006.01) | |
| C04B 14/10 | (2006.01) | |
| C04B 14/30 | (2006.01) | |
| C04B 22/06 | (2006.01) | |
| C04B 111/00 | (2006.01) | |
| C04B 111/52 | (2006.01) | |

(52) U.S. Cl.
CPC .............. *C04B 28/26* (2013.01); *B32B 11/04* (2013.01); *B61D 17/185* (2013.01); *C04B 14/041* (2013.01); *C04B 14/10* (2013.01); *C04B 14/303* (2013.01); *C04B 14/308* (2013.01); *C04B 22/062* (2013.01); *C04B 22/064* (2013.01); *B32B 2307/102* (2013.01); *C04B 2111/00612* (2013.01); *C04B 2111/52* (2013.01)

(58) Field of Classification Search
CPC ....... C04B 12/04; C04B 14/041; C04B 14/10; C04B 14/303; C04B 14/304; C04B 14/308; C04B 22/062; C04B 22/064; C04B 28/24; C04B 28/26; C04B 2111/00612; C04B 2111/52; B32B 3/30; B32B 3/06; B32B 5/02; B32B 5/16; B32B 5/18; B32B 7/12; B32B 9/025; B32B 9/041; B32B 9/042; B32B 9/045; B32B 9/046; B32B 9/048; B32B 11/04; B32B 15/10; B32B 15/082; B32B 15/046; B32B 15/16; B32B 15/18; B32B 15/20; B32B 21/047; B32B 21/08; B32B 21/12; B32B 21/14; B32B 27/14; B32B 27/304; B32B 2260/04; B32B 2260/025; B32B 2307/50; B32B 2307/54; B32B 2307/72; B32B 2307/714; B32B 2307/732; B32B 2307/102; B32B 2307/3065; B32B 2264/102; B32B 2605/10; B61D 17/185; Y02T 30/00

See application file for complete search history.

(56) References Cited

FOREIGN PATENT DOCUMENTS

| CN | 104072083 A | | 10/2014 |
|---|---|---|---|
| CN | 104261792 A | * | 1/2015 |
| CN | 205364727 U | | 7/2016 |
| CN | 106187021 A | | 12/2016 |

OTHER PUBLICATIONS

International Search Report of PCT Patent Application No. PCT/CN2018/099484 dated Oct. 24, 2018.

\* cited by examiner

*Primary Examiner* — Anthony J Green

(57) ABSTRACT

A sound insulating material, a sound insulating plate, and a partition structure of a train carriage are provided. The sound insulating material comprises the following components in weight ratio: 2-8 parts of tricalcium silicate; 4-10 parts of calcium hydroxide; 10-30 parts of aluminosilicate; 4-10 parts of alumina; 5-15 parts of iron oxide; 10-30 parts of a binder; and 5-10 parts of a curing agent, wherein the binder is at least two of lithium silicate, sodium silicate and calcium silicate; the curing agent is at least one of lithium oxide, magnesium oxide and silica; and the mixture of the aluminosilicate, alumina and iron oxide expands at 1000° C.-1350° C. to form particles. The sound insulating plate made of this material is lightweight and has a sound insulation capacity of 35-42 dB.

18 Claims, 10 Drawing Sheets

SOUND INSULATING MATERIAL, SOUND INSULATING PLATE AND PARTITION STRUCTURE OF TRAIN CARRIAGE

CROSS REFERENCE TO RELATED APPLICATIONS

This application is a continuation application of PCT/CN2018/099484, filed on Aug. 9, 2018, which claims priority of Chinese Patent Application No. 201710781265.3 filed on Sep. 1, 2017. The contents of the applications are hereby incorporated by reference in their entireties.

TECHNICAL FIELD

The present application relates to the field of sound insulating materials, and more particularly to a sound insulating material and a sound insulating plate and a partition structure of a train carriage.

BACKGROUND TECHNOLOGY

With the advancement of society and the development of science and technology, high-speed rail is becoming more and more popular in various places. Due to convenience and high speed, it has gradually become necessary means of transportation for travel. When the train runs at high speed, it will generate large noise. If the sound insulation effect of the wall of the train is poor, it will have a great impact on the passenger's body and spirit, which will reduce the comfort of the train. Also, the fireproofing of trains is also an important issue.

Chinese patent 'A composite sheet for railcar' (application No. CN201620083573.X) disclosed a composite sheet for railcar, including a reinforcing plate, a waterproof layer, a sound absorbing cotton layer and a composite panel, which are laminated from bottom to top. Two or more layers of asbestos mesh are adhered between the sound absorbing cotton layer and the composite panel, and a reinforcing rib for reinforcing the joint strength is evenly distributed between the waterproof layer and the composite panel, and a layer of wear-resistant ceramic sheet formed by bonded epoxy resin is adhered to an upper surface of the composite panel. The composite sheet of the above patent has poor sound insulation and fireproofing effect in its application on carriages, which is significantly below the requirements of the current high-speed rail. Moreover, the existing composite sheet used on carriages has been found to produce formaldehyde that is harmful to the human body, as well as harmful heavy metals, such as lead, cadmium, mercury, and hexavalent chromium.

Therefore, a material that is sound-insulating, fireproof and environment-friendly is considered together with a plate thereof.

SUMMARY

An objective of the present application is to provide a sound insulating material and a sound insulating plate and a partition structure of a train carriage to overcome the deficiencies of prior art.

To achieve the above objective, the technical proposal of the present application is:

A sound insulating material comprising the following components in weight ratio:
  Tricalcium silicate: 2-8 parts;
  Calcium hydroxide: 4-10 parts;
  Aluminosilicate: 10-30 parts;
  Alumina: 4-10 parts;
  Iron oxide: 5-15 parts;
  Binder: 10-30 parts;
  Curing agent: 5-10 parts;

Wherein the binder is at least two of lithium silicate, sodium silicate, and calcium silicate; and the curing agent is at least one of lithium oxide, magnesium oxide, and silica;

Mixture of aluminosilicate, alumina and iron oxide are expanded and form particles at 1000° C.1350° C.; the particles are mixed with tricalcium silicate, calcium hydroxide, the binder and the curing agent and poured into a forming mold, heated and pressurized to form the material.

A further technical proposal is: further includes clay, the content of which in weight ratio is 5-10 parts.

A further technical proposal is: when the binder is a mixture of lithium silicate and sodium silicate, the components in weight ratio are:
  Lithium silicate: 6-15 parts;
  Sodium silicate: 5-15 parts;
  When the binder is a mixture of lithium silicate and calcium silicate, the components in weight ratio are:
  Lithium silicate: 5-10 parts;
  Calcium silicate: 7-20 parts;
  When the binder is a mixture of sodium silicate and calcium silicate, the components in weight ratio are:
  Sodium silicate: 7-18 parts;
  Calcium silicate: 6-12 parts;
  When the binder is a mixture of lithium silicate, sodium silicate and calcium silicate, the components in weight ratio are:
  Lithium silicate: 1-10 parts;
  Sodium silicate: 3-10 parts;
  Calcium silicate: 3-8 parts;

A further technical proposal is: when the component of the curing agent is a mixture of lithium oxide or magnesium oxide, the components in weight ratio are:
  Lithium oxide: 3-6 parts;
  Magnesium oxide: 2-4 parts;
  Or when the component of the curing agent is a mixture of lithium oxide and silica, the components in weight ratio are:
  Lithium oxide: 4-7 parts;
  Silica: 2-3 parts;
  Or when the component of the curing agent is a mixture of magnesium oxide and silica, the components in weight ratio are:
  Magnesium oxide: 3-5 parts;
  Silica: 3-5 parts;
  Or when the component of the curing agent is a mixture of lithium oxide, magnesium oxide and silica, the components in weight ratio are:
  Lithium oxide: 2-4 parts;
  Magnesium oxide: 2-3 parts;
  Silica: 1-3 parts;

A further technical proposal is: the diameter of the particles is 0.5-12 mm; the material is formed by pressurizing the particles with the tricalcium silicate, calcium hydroxide, the binder, the curing agent at 35-60 MPa in a mold cavity at a temperature of 180° C.-245° C., and holding for 50-90 minutes.

A sound insulating plate comprises a plate body. The plate body comprises the fireproof material described above.

A further technical proposal is: a protective layer is provided on one side or both sides of the plate body; the thickness of the plate body is 12-35 mm; and the protective layer is constituted by one or two of a metal layer, a wood layer, a plastic layer or a leather layer.

A sound insulating partition structure of train carriages comprises a wall body and the above-mentioned sound insulating plate; wherein a plurality of sound insulating plates are joined together and fixedly coupled to the wall body to form a fireproof and sound insulating structure.

A further technical proposal is: an inner side of the wall body is further provided with a decorative layer; the sound insulating plate is disposed between an inner wall of the wall body and the decorative layer to form a sandwich structure; the sound insulating plate is fixedly coupled with the inner wall of the wall body via a fastener provided, and a bonding layer is provided at the contact region between the sound insulating plate and the inner wall of the wall body.

A further technical proposal is: the carriage is provided with a fixing plate, and the sound insulating plate is fixed to one side or both sides of the fixing plate.

The beneficial effects of the present application compared with the prior art are: in the present application, the mixture of aluminosilicate, alumina and iron oxide expands to form particles at high temperature, the particles are then mixed with the binder, the clay and the curing agent, and pressed in a specific mold at certain temperature to form a material having good sound insulating and fireproof performance. Wherein, the components of the binder are at least two of lithium silicate, sodium silicate and calcium silicate; and the component of the curing agent is at least one of lithium oxide, magnesium oxide and silica. The sound insulating plate made from the above material has a light weight and the sound insulation amount reaches 35-42 dB. This sound insulating plate is especially used for partitions or partitioning walls of high-speed rail and train carriages. It has been tested to have good sound insulating effect, high impact resistance and environment-friendly and be free of harmful gases and heavy metals. The sound insulating material and products thereof of the present application have good sound insulating effect, low density, high compressive strength and tensile strength and high fire resistance, and, at the same, are environment-friendly, low-carbon, energy saving and renewable.

The present application is further described below in conjunction with the accompanying drawings and detailed embodiments.

DESCRIPTION OF THE EMBODIMENTS

Figure 1:
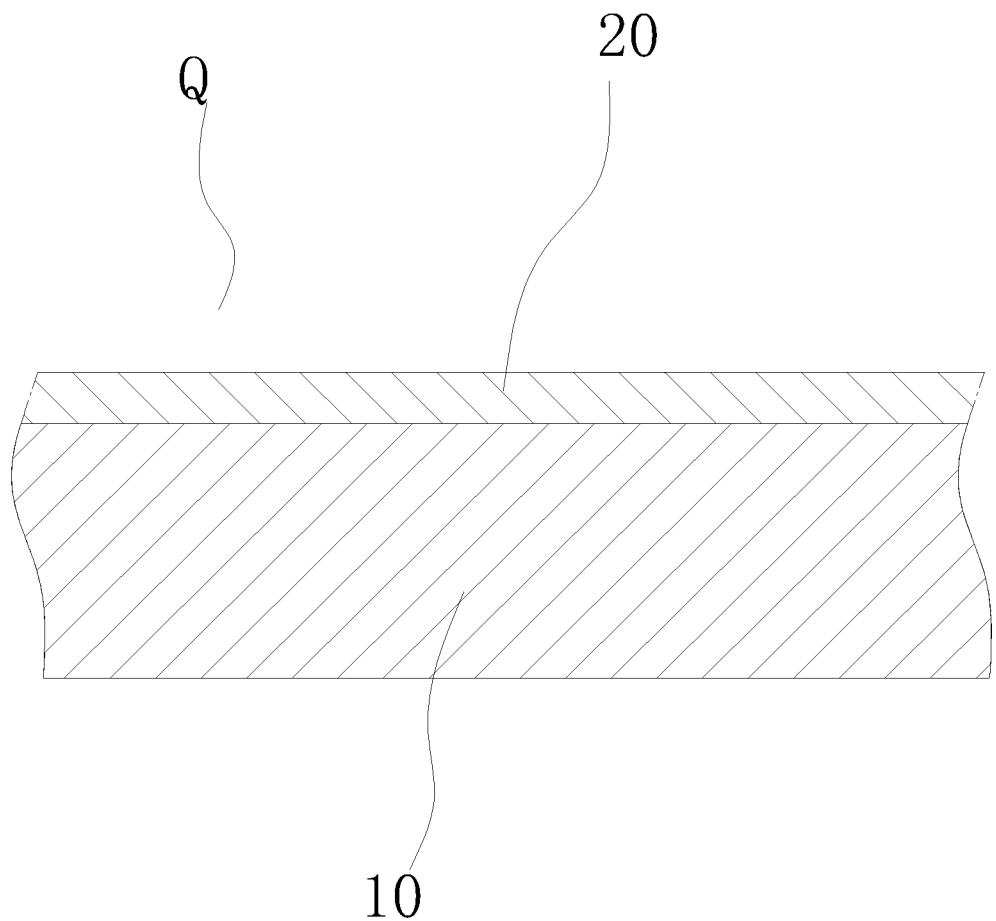
FIG. 1 is a schematic structural view of a single-sided enamel layer according to an embodiment of a sound insulating plate of the present application.

In order to more fully understand the technical content of the present application, the technical proposals of the present application are further described and illustrated in conjunction with the detailed embodiments, but are not limited thereto.

A sound insulating material comprises the following components in weight ratio:

Tricalcium silicate: 2-8 parts;
Calcium hydroxide: 4-10 parts;
Aluminosilicate: 10-30 parts;
Alumina: 4-10 parts;
Iron oxide: 5-15 parts;
Binder: 10-30 parts;
Curing agent: 5-10 parts;

Wherein the components of the binder are at least two of lithium silicate, sodium silicate, and component calcium silicate; and the curing agent is at least one of lithium oxide, magnesium oxide, and silica;

Aluminosilicate, alumina and iron oxide are mixed to be heated and pressurized, and form particles with a diameter of 0.5-12 mm. On the basis of this, the particles are further mixed with tricalcium silicate, calcium hydroxide, the binder, and the curing agent and poured into a forming mold to be heated and pressurized.

Wherein, clay is also included, and the content thereof in weight ratio is 5-10 parts. Clay is used to be filled between the various particles to make the material more compact during the forming process.

When the binder is a mixture of lithium silicate and sodium silicate, the components in weight ratio are:

Lithium silicate: 6-15 parts;
Sodium silicate: 5-15 parts;

When the binder is a mixture of lithium silicate and calcium silicate, the components in weight ratio are:

Lithium silicate: 5-10 parts;
Calcium silicate: 7-20 parts;

When the binder is a mixture of sodium silicate and calcium silicate, the components in weight ratio are:

Sodium silicate: 7-18 parts;
Calcium silicate: 6-12 parts;

When the binder is a mixture of lithium silicate, sodium silicate and calcium silicate, the components in weight ratio are:

Lithium silicate: 1-10 parts;
Sodium silicate: 3-10 parts;
Calcium silicate: 3-8 parts;

When the component of the curing agent is a mixture of lithium oxide or magnesium oxide, the components in weight ratio are:

Lithium oxide: 3-6 parts;
Magnesium oxide: 2-4 parts;

Or when the component of the curing agent is a mixture of lithium oxide and silica, the components in weight ratio are:

Lithium oxide: 4-7 parts;
Silica: 2-3 parts;

Or when the component of the curing agent is a mixture of magnesium oxide and silica, the components in weight ratio are:
Magnesium oxide: 3-5 parts;
Silica: 3-5 parts;
Or when the component of the curing agent is a mixture of lithium oxide, magnesium oxide and silica, the components in weight ratio are:
Lithium oxide: 2-4 parts;
Magnesium oxide: 2-3 parts;
Silica: 1-3 parts;

Mixture of aluminosilicate, alumina and iron oxide is expanded and forms particles at 1000° C.-1350° C.; the particles are pressurized with tricalcium silicate, calcium hydroxide, the binder and the curing agent at 35-60 MPa in a mold cavity at a temperature of 180° C.-245° C., and held for 50-90 minutes.

The material is formed by mixing aluminosilicate, alumina and iron oxide to form particles, and pressurizing the particles with the binder and the curing agent at a high temperature. The material has good compactness, and the compressive strength is 630-680 KPa, the tensile strength is 100-150 KPa, and the burning behavior is grade A1, which has high economic value. The present material can be used as fireproof materials and sound insulating materials.

Embodiment 1, a sound insulating material with the following weight ratio:
Tricalcium silicate: 2 parts;
Calcium hydroxide: 4 parts;
Aluminosilicate: 10 parts;
Alumina: 4 parts;
Iron oxide: 5 parts;
Binder: 10 parts;
Curing agent: 5 parts;
Clay: 5 parts;
And when the binder is a mixture of lithium silicate and calcium silicate, the components in weight ratio are:
Lithium silicate: 6 parts;
Calcium silicate: 5 parts;
When the component of the curing agent is a mixture of lithium oxide and magnesium oxide, the components in weight ratio are:
Lithium oxide: 3 parts;
Magnesium oxide: 2 parts.

The mixture of aluminosilicate, alumina and iron oxide is expanded and forms particles with a diameter of 0.8-6 mm at 1100° C.; the particles are pressurized with tricalcium silicate, calcium hydroxide, the binder and the curing agent at 45 MPa in a mold cavity at a temperature of 200° C., and held for 70 minutes. The density is 670 kg/m³. According to the present embodiment, the sound insulation capacity of the sound insulating plate made is 38.3 dB.

Embodiment 2, a sound insulating material with the following weight ratio:
Tricalcium silicate: 5 parts;
Calcium hydroxide: 7 parts;
Aluminosilicate: 20 parts;
Alumina: 7 parts;
Iron oxide: 10 parts;
Binder: 23 parts;
Curing agent: 7.5 parts;
Clay: 8 parts;
And when the binder is a mixture of lithium silicate and sodium silicate, the components in weight ratio are:
Lithium silicate: 8 parts;
Sodium silicate: 15 parts;

When the component of the curing agent is a mixture of lithium oxide and silica, the components in weight ratio are:
Lithium oxide: 5 parts;
Silica: 2.5 parts.

The mixture of aluminosilicate, alumina and iron oxide is expanded and forms particles with a diameter of 0.8-6 mm at 1200° C.; the particles are pressurized with tricalcium silicate, calcium hydroxide, the binder and the curing agent at 50 MPa in a mold cavity at a temperature of 220° C., and held for 80 minutes. The density is 750 kg/m³. According to the present embodiment, the sound insulation capacity of the sound insulating plate made is 38.6 dB.

Embodiment 3, a sound insulating material with the following weight ratio:
Tricalcium silicate: 8 parts;
Calcium hydroxide: 10 parts;
Aluminosilicate: 30 parts;
Alumina: 10 parts;
Iron oxide: 15 parts;
Binder: 30 parts;
Curing agent: 10 parts;
Clay: 10 parts;
And when the binder is a mixture of sodium silicate and calcium silicate, the components in weight ratio are:
Sodium silicate: 18 parts;
Calcium silicate: 12 parts;
When the component of the curing agent is a mixture of magnesium oxide and silica, the components in weight ratio are:
Magnesium oxide: 5 parts;
Silica: 5 parts.

The mixture of aluminosilicate, alumina and iron oxide is expanded and forms particles with a diameter of 0.8-6 mm at 1300° C.; the particles are pressurized with tricalcium silicate, calcium hydroxide, the binder and the curing agent at 50 MPa in a mold cavity at a temperature of 220° C., and held for 80 minutes. The density is 820 kg/m³. According to the present embodiment, the sound insulation capacity of the sound insulating plate made is 38.8 dB.

Embodiment 4, a sound insulating material with the following weight ratio:
Tricalcium silicate: 9 parts;
Calcium hydroxide: 9 parts;
Aluminosilicate: 27 parts;
Alumina: 8 parts;
Iron oxide: 13 parts;
Binder: 20 parts;
Curing agent: 7.5 parts;
Clay: 8 parts;
And when the binder is a mixture of lithium silicate, sodium silicate and calcium silicate, the components in weight ratio are:
Lithium silicate: 8 parts;
Sodium silicate: 7 parts;
Calcium silicate: 5 parts;
When the component of the curing agent is a mixture of lithium oxide, magnesium oxide and silica, the components in weight ratio are:
Lithium oxide: 3 parts;
Magnesium oxide: 2.5 parts;
Silica: 2 parts.

The mixture of aluminosilicate, alumina and iron oxide is expanded and forms particles with a diameter of 0.8-6 mm at 1350° C.; the particles are pressurized with tricalcium silicate, calcium hydroxide, the binder and the curing agent at 60 MPa in a mold cavity at a temperature of 240° C., and held for 90 minutes. The density is 880 kg/m³. According to the present embodiment, the sound insulation capacity of the sound insulating plate made is 39.1 dB.

Embodiment 5, a sound insulating material with the following weight ratio:
Tricalcium silicate: 2 parts;
Calcium hydroxide: 10 parts;
Aluminosilicate: 4 parts;
Alumina: 10 parts;
Iron oxide: 5 parts;
Binder: 21 parts;
Curing agent: 9 parts;
Clay: 10 parts;
And when the binder is a mixture of lithium silicate, sodium silicate and calcium silicate, the components in weight ratio are:
Lithium silicate: 10 parts;
Sodium silicate: 3 parts;
Calcium silicate: 8 parts;
When the component of the curing agent is a mixture of lithium oxide, magnesium oxide and silica, the components in weight ratio are:
Lithium oxide: 4 parts;
Magnesium oxide: 2 parts;
Silica: 3 parts.

The mixture of aluminosilicate, alumina and iron oxide is expanded and forms particles with a diameter of 0.8-6 mm at 1350° C.; the particles are pressurized with tricalcium silicate, calcium hydroxide, the binder and the curing agent at 60 MPa in a mold cavity at a temperature of 240° C., and held for 90 minutes. The density is 900 kg/m³. According to the present embodiment, the sound insulation capacity of the sound insulating plate made is 40.2 dB.

Embodiment 6, a sound insulating material with the following weight ratio:
Tricalcium silicate: 8 parts;
Calcium hydroxide: 4 parts;
Aluminosilicate: 30 parts;
Alumina: 4 parts;
Iron oxide: 15 parts;
Binder: 14 parts;
Curing agent: 6 parts;
Clay: 5 parts;
And when the binder is a mixture of lithium silicate, sodium silicate and calcium silicate, the components in weight ratio are:
Lithium silicate: 1 part;
Sodium silicate: 10 parts;
Calcium silicate: 3 parts;
When the component of the curing agent is a mixture of lithium oxide, magnesium oxide and silica, the components in weight ratio are:
Lithium oxide: 2 parts;
Magnesium oxide: 3 parts;
Silica: 1 part.

The mixture of aluminosilicate, alumina and iron oxide is expanded and forms particles with a diameter of 0.8-6 mm at 1350° C.; the particles are pressurized with tricalcium silicate, calcium hydroxide, the binder and the curing agent at 60 MPa in a mold cavity at a temperature of 240° C., and held for 90 minutes. The density is 890 kg/m³. According to the present embodiment, the sound insulation capacity of the sound insulating plate made is 40 dB.

Embodiment 7, a sound insulating material with the following weight ratio:
Tricalcium silicate: 6 parts;
Calcium hydroxide: 8 parts;
Aluminosilicate: 22 parts;
Alumina: 8 parts;
Iron oxide: 14 parts;
Binder: 21 parts;
Curing agent: 8 parts;
Clay: 5 parts;
Butyl rubber: 8 parts;
And when the binder is a mixture of lithium silicate, sodium silicate and calcium silicate, the components in weight ratio are:
Lithium silicate: 8 parts;
Sodium silicate: 8 parts;
Calcium silicate: 5 parts;
When the component of the curing agent is a mixture of lithium oxide, magnesium oxide and silica, the components in weight ratio are:
Lithium oxide: 3 parts;
Magnesium oxide: 2 parts;
Silica: 3 parts.

The mixture of aluminosilicate, alumina and iron oxide is expanded and forms particles with a diameter of 0.8-6 mm at 1350° C.; the particles are pressurized with tricalcium silicate, calcium hydroxide, the binder, the curing agent and butyl rubber at 60 MPa in a mold cavity at a temperature of 240° C., and held for 90 minutes. The density is 840 kg/m³. According to the present embodiment, the sound insulation capacity of the sound insulating plate made is 40.4 dB.

Embodiment 8, a sound insulating material with the following weight ratio:
Tricalcium silicate: 7 parts;
Calcium hydroxide: 6 parts;
Aluminosilicate: 28 parts;
Alumina: 8 parts;
Iron oxide: 11 parts;
Binder: 26 parts;
Curing agent: 7 parts;
Clay: 7 parts;
Butyl rubber: 10 parts;
And when the binder is a mixture of lithium silicate, sodium silicate and calcium silicate, the components in weight ratio are:
Lithium silicate: 8 parts;
Sodium silicate: 10 parts;
Calcium silicate: 8 parts;
When the component of the curing agent is a mixture of lithium oxide, magnesium oxide and silica, the components in weight ratio are:
Lithium oxide: 2 parts;
Magnesium oxide: 3 parts;
Silica: 2 parts.

The mixture of aluminosilicate, alumina and iron oxide is expanded and forms particles with a diameter of 0.8-6 mm at 1350° C.; the particles are pressurized with tricalcium silicate, calcium hydroxide, the binder, the curing agent and butyl rubber at 60 MPa in a mold cavity at a temperature of 240° C., and held for 90 minutes. The density is 850 kg/m³. According to the present embodiment, the sound insulation capacity of the sound insulating plate made is 40.6 dB.

Embodiment 9, a sound insulating material with the following weight ratio:
Tricalcium silicate: 8 parts;
Calcium hydroxide: 6 parts;
Aluminosilicate: 27 parts;
Alumina: 7 parts;
Iron oxide: 13 parts;
Binder: 26 parts;
Curing agent: 7 parts;
Clay: 6 parts;

And when the binder is a mixture of lithium silicate, sodium silicate and calcium silicate, the components in weight ratio are:
Lithium silicate: 8 parts;
Sodium silicate: 10 parts;
Calcium silicate: 8 parts;
When the component of the curing agent is a mixture of lithium oxide, magnesium oxide and silica, the components in weight ratio are:
Lithium oxide: 2 parts;
Magnesium oxide: 3 parts;
Silica: 2 parts.
The mixture of aluminosilicate, alumina and iron oxide is expanded and forms particles with a diameter of 0.8-6 mm at 1250° C.; the particles are pressurized with tricalcium silicate, calcium hydroxide, the binder and the curing agent at 60 MPa in a mold cavity at a temperature of 190° C., and held for 90 minutes. The density is 880 kg/m$^3$. According to the present embodiment, the sound insulation capacity of the sound insulating plate made is 39.3 dB.

Embodiment 10, a sound insulating material with the following weight ratio:
Tricalcium silicate: 8 parts;
Calcium oxide: 2 parts;
Water: 7 parts;
Aluminosilicate: 27 parts;
Alumina: 7 parts;
Iron oxide: 13 parts;
Binder: 26 parts;
Curing agent: 7 parts;
And when the binder is a mixture of lithium silicate, sodium silicate and calcium silicate, the components in weight ratio are:
Lithium silicate: 8 parts;
Sodium silicate: 10 parts;
Calcium silicate: 8 parts;
When the component of the curing agent is a mixture of lithium oxide, magnesium oxide and silica, the components in weight ratio are:
Lithium oxide: 2 parts;
Magnesium oxide: 3 parts;
Silica: 2 parts.
The mixture of aluminosilicate, alumina and iron oxide is expanded and forms particles with a diameter of 0.8-6 mm at 1350° C.; the particles are pressurized with tricalcium silicate, calcium oxide, water, the binder and the curing agent at 60 MPa in a mold cavity at a temperature of 210° C., and held for 90 minutes. The density is 853 kg/m$^3$. According to the present embodiment, the sound insulation capacity of the sound insulating plate made is 39.4 dB.

Embodiment 11, a sound insulating material with the following weight ratio:
Tricalcium silicate: 8 parts;
Calcium hydroxide: 2 parts;
Aluminosilicate: 27 parts;
Alumina: 7 parts;
Iron oxide: 13 parts;
Binder: 26 parts;
Curing agent: 7 parts;
Clay: 6 parts;
Plaster: 8 parts;
And when the binder is a mixture of lithium silicate, sodium silicate and calcium silicate, the components in weight ratio are:
Lithium silicate: 8 parts;
Sodium silicate: 10 parts;
Calcium silicate: 8 parts;
When the component of the curing agent is a mixture of lithium oxide, magnesium oxide and silica, the components in weight ratio are:
Lithium oxide: 2 parts;
Magnesium oxide: 3 parts;
Silica: 2 parts.
The mixture of aluminosilicate, alumina and iron oxide is expanded and forms particles with a diameter of 0.8-6 mm at 1350° C.; the particles are pressurized with tricalcium silicate, plaster, calcium hydroxide, the binder and the curing agent at 60 MPa in a mold cavity at a temperature of 210° C., and held for 90 minutes. The density is 920 kg/m$^3$. According to the present embodiment, the sound insulation capacity of the sound insulating plate made is 39.8 dB.

Embodiment 12, a sound insulating material with the following weight ratio:
Tricalcium silicate: 8 parts;
Calcium hydroxide: 2 parts;
Aluminosilicate: 27 parts;
Alumina: 7 parts;
Iron oxide: 13 parts;
Binder: 26 parts;
Curing agent: 7 parts;
Clay: 6 parts;
Plaster: 12 parts;
And when the binder is a mixture of lithium silicate, sodium silicate and calcium silicate, the components in weight ratio are:
Lithium silicate: 8 parts;
Sodium silicate: 10 parts;
Calcium silicate: 8 parts;
When the component of the curing agent is a mixture of lithium oxide, magnesium oxide and silica, the components in weight ratio are:
Lithium oxide: 2 parts;
Magnesium oxide: 3 parts;
Silica: 2 parts.
The mixture of aluminosilicate, alumina and iron oxide is expanded and forms particles with a diameter of 0.8-6 mm at 1350° C.; the particles are pressurized with tricalcium silicate, plaster, calcium hydroxide, the binder and the curing agent at 60 MPa in a mold cavity at a temperature of 210° C., and held for 90 minutes. The density is 920 kg/m$^3$. According to the present embodiment, the sound insulation capacity of the sound insulating plate made is 41 dB.

As can be seen from the above embodiments, the density of the material is increased by a little after the addition of the clay in embodiments 1 to 6, but the sound insulating effect is remarkably increased. As can be seen from embodiments 7 and 8, the density of the material is reduced after the addition of the butyl rubber while the sound insulating effect is still increased. As can be seen from embodiments 9 and 10, if the original calcium hydroxide is replaced by calcium oxide and water, a high heating temperature is not required so that the production cost can be saved. As can be seen from embodiments 11 and 12, with plaster as filler, the density of the material increases with the proportion of plaster rises, and the sound insulating effect also enhances accordingly.

Figure 2:
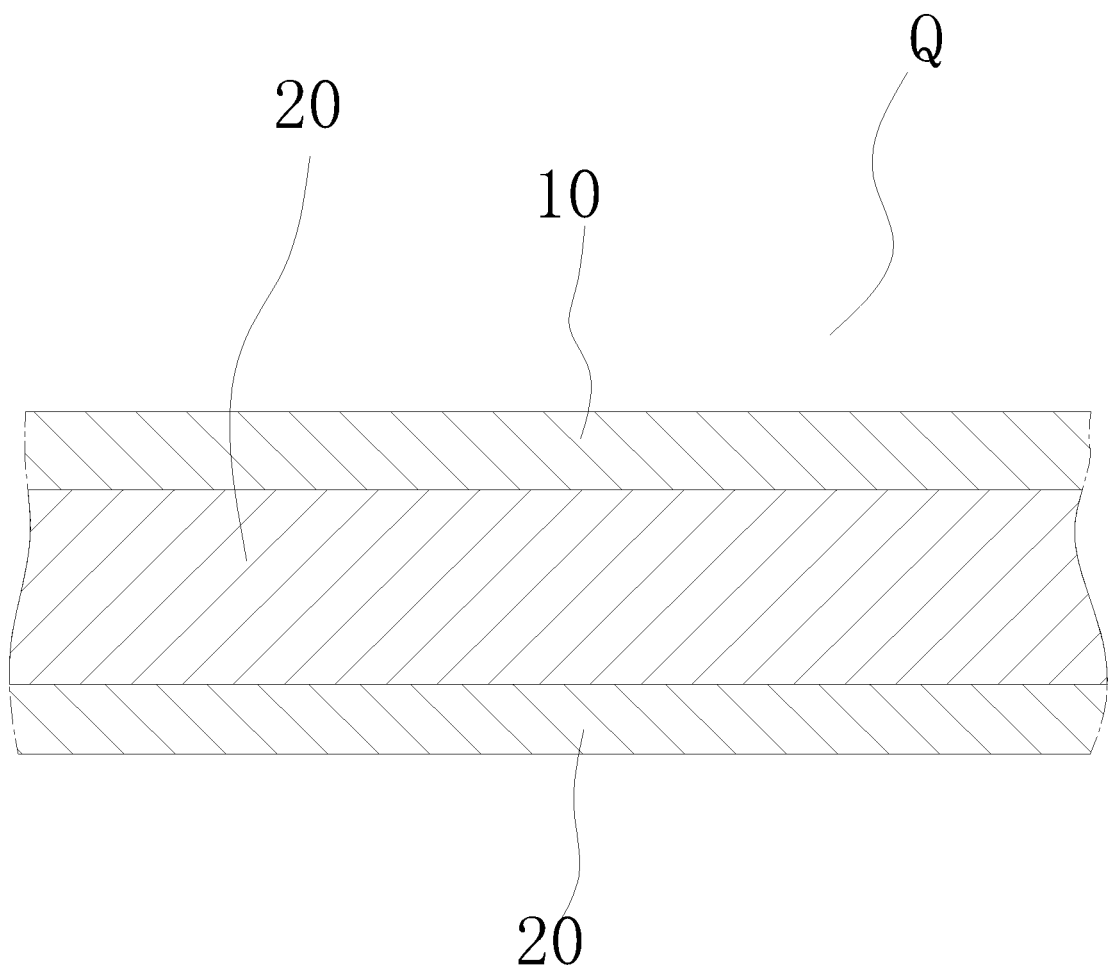
FIG. 2 is a schematic structural view of a double-sided enamel layer according to an embodiment of a sound insulating plate of the present application.

A sound insulating plate Q, as shown in FIGS. 1 and 2, includes a plate body 10, and the plate body 10 comprises the above-mentioned sound insulating material. The shape of the sound insulating plate Q can be made into plates of various shapes as needed. After testing, the burning behavior of the sound insulating plate Q reaches A1 grade, the thermal conductivity is 0.035-0.0664 W/(mk) (25° C.), the compressive strength is 30-680 KPa, the tensile strength is 100-150 KPa, the average sound insulation capacity reaches 35-42 dB, and the density reaches 650-950 kg/m³. According to the performance of the sound insulating plate Q, the sound insulating plate Q can be used in various fields relating to sound insulation, especially in the sound insulating plate on high-speed rails and trains.

A protective layer 20 is arranged on an outer side of the plate body 10. The thickness of the protective layer 20 is ⅕-⅟₈₀ of the thickness of the plate body 10. The thickness of the plate body 10 is 12-35 mm. Preferably, the protective layer 20 is arranged on both sides of the plate body 10. The protective layer is a metal layer. Usually, aluminum alloy, stainless steel, etc. are used as the metal layer, and the metal layer should have the advantages of corrosion resistance, oxidation resistance, and light weight.

More preferably, the protective layer may be composed of one or two of a metal layer, a wood layer, a plastic layer or a leather layer. That is, the plate body 10 can use the metal layer, the wood layer, the plastic layer or the leather layer directly as a single-layered protective layer 20. The protective layer 20 may also be a double-layered structure. For example, one side or both sides of the plate body 10 is/are first fixed with the metal layer, and then the wood layer, the plastic layer or the leather layer is bonded to an outside of the metal layer; one side or two sided of the plate body 10 is/are first fixed with the wood layer, and then the plastic layer or leather layer is bonded to the outside of the wood layer; and so on. The protective layer 20 may also have a multi-layered structure. For example, the plate body 10 is first bonded to the metal layer, and then the plastic layer and the leather layer are bonded to the outside of the metal layer; the plate body 10 is first bonded to the plastic layer, and then the wood layer and the leather layer is bonded to the outside of the plastic layer; and so on. The wood layer may be thick veneer and imitation veneer, etc.; the plastic layer may be PVC and PE glue, etc.; the leather layer may be cowhide, imitation leather, decorative leather surface, and the like.

Preferably, the metal layer is fixed to one side or both sides of the plate body 10 as needed. The metal layer is fixed by an adhesive under certain pressure to be fixed on both sides of the plate body.

In other embodiments, for a better sound insulation effect, a plurality of sound insulating plates may be fixed by adhesive layers to form a combined sound insulating plate. The adhesive layer may be a foam layer, a sponge layer, a cloth layer or the like, or may be other materials having a lower density than the sound insulating plate.

Figure 3:
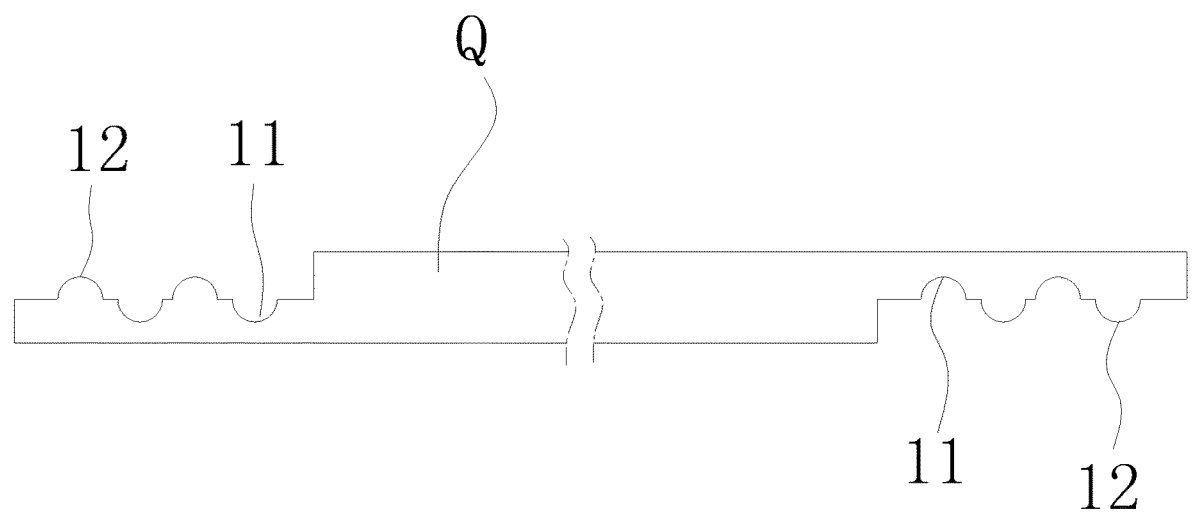
FIG. 3 is a schematic structural view of a joint according to an embodiment of a sound insulating plate of the present application.
Figure 4:
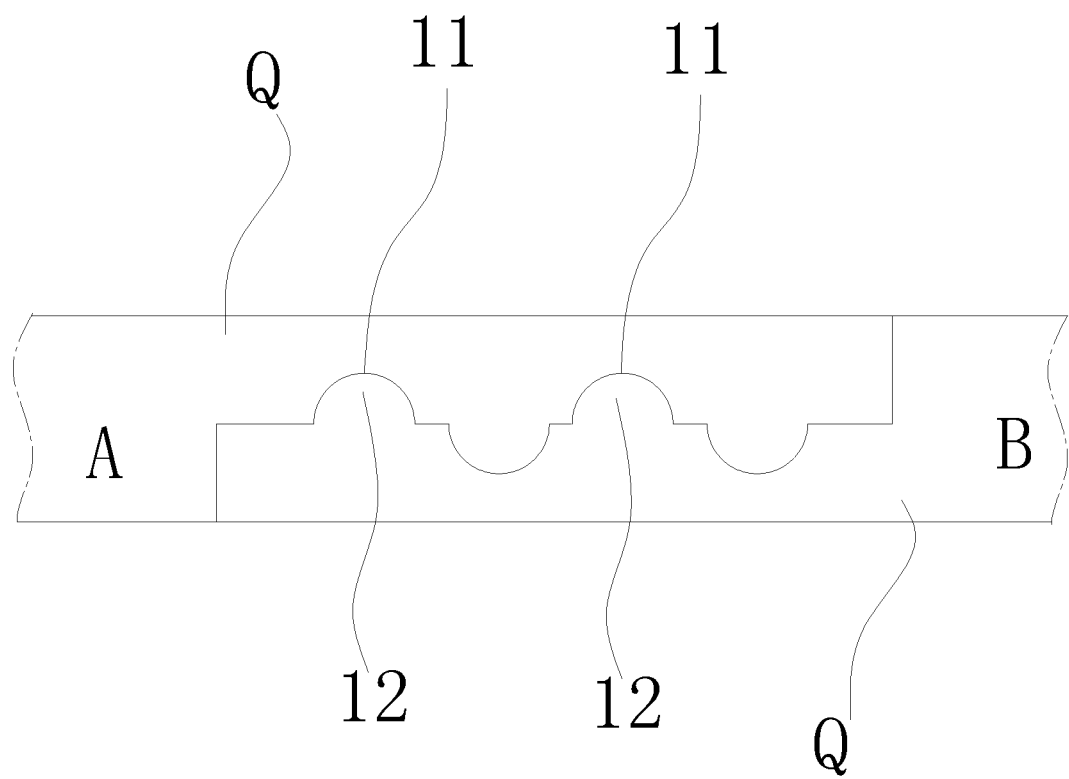
FIG. 4 is a schematic view showing the installation of two adjacent sound insulating plates according to an embodiment of a sound insulating plate of the present application.
Figure 5:
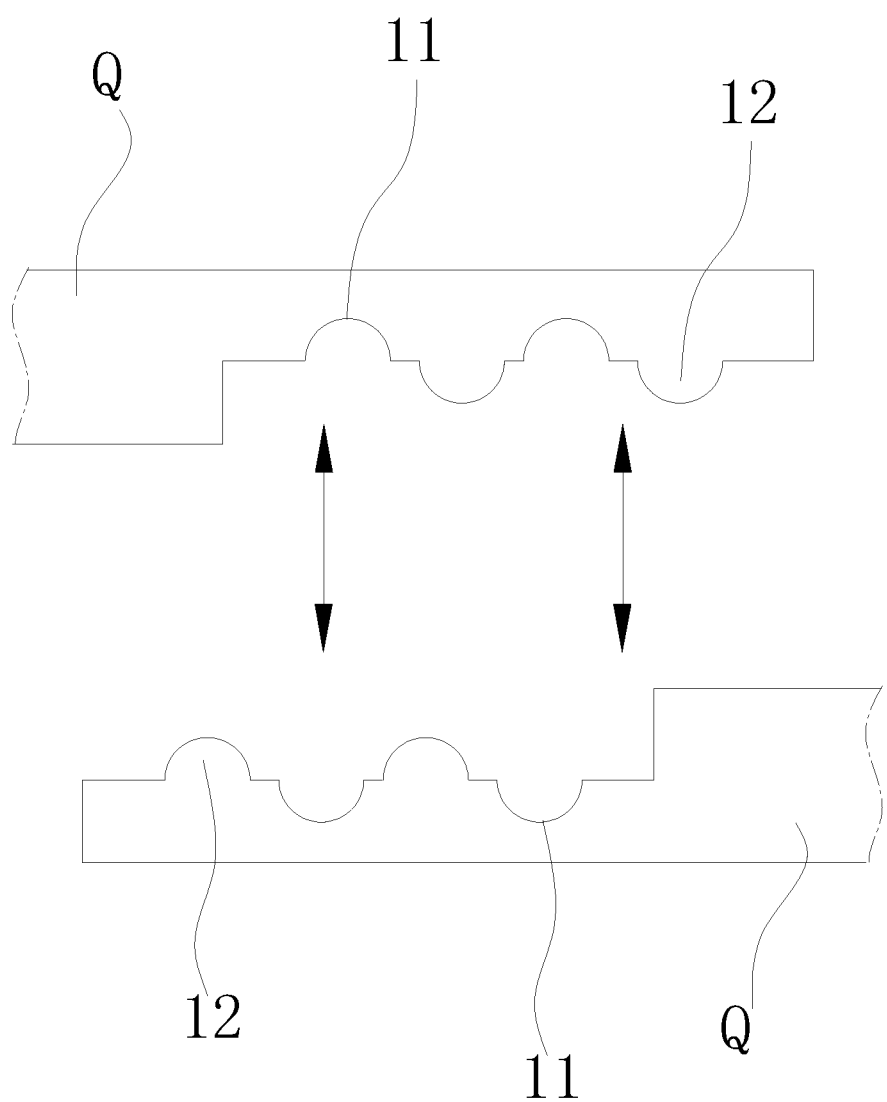
FIG. 5 is a schematic view showing the process of the installation of two adjacent sound insulating plates according to an embodiment of a sound insulating plate of the present application.
Figure 6:
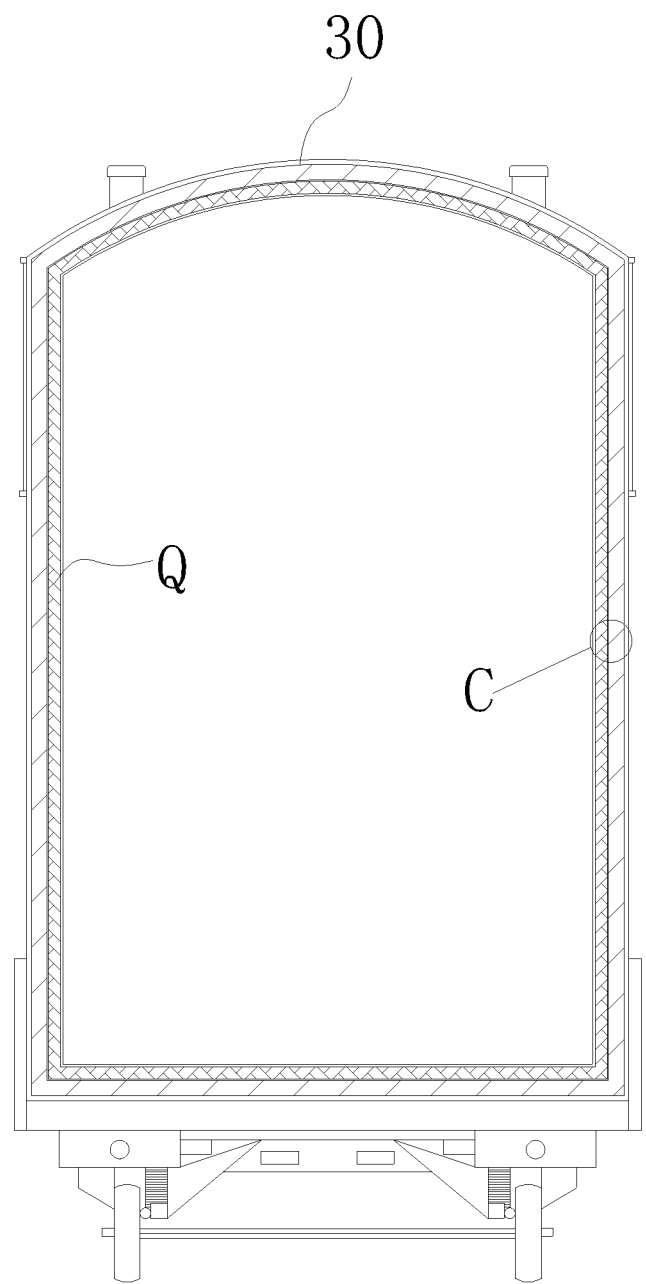
FIG. 6 is a schematic cross-sectional structural view according to an embodiment of a sound insulating partition structure of a train carriage of the present application.
Figure 7:
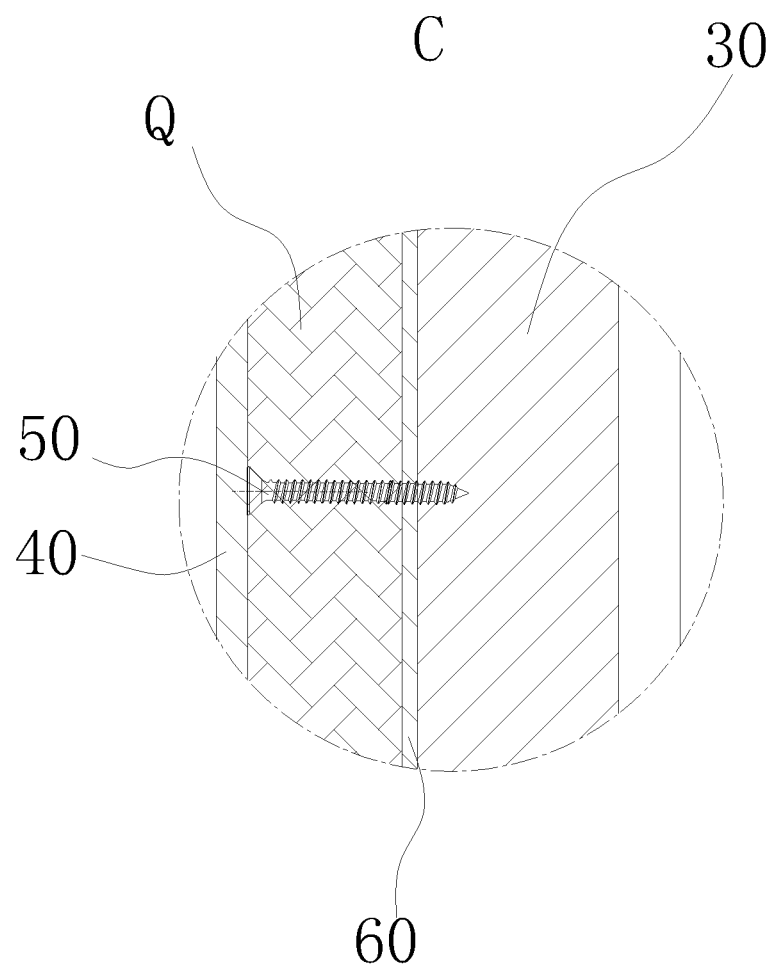
FIG. 7 is a partial enlarged view of part C in FIG. 6.
Figure 8:
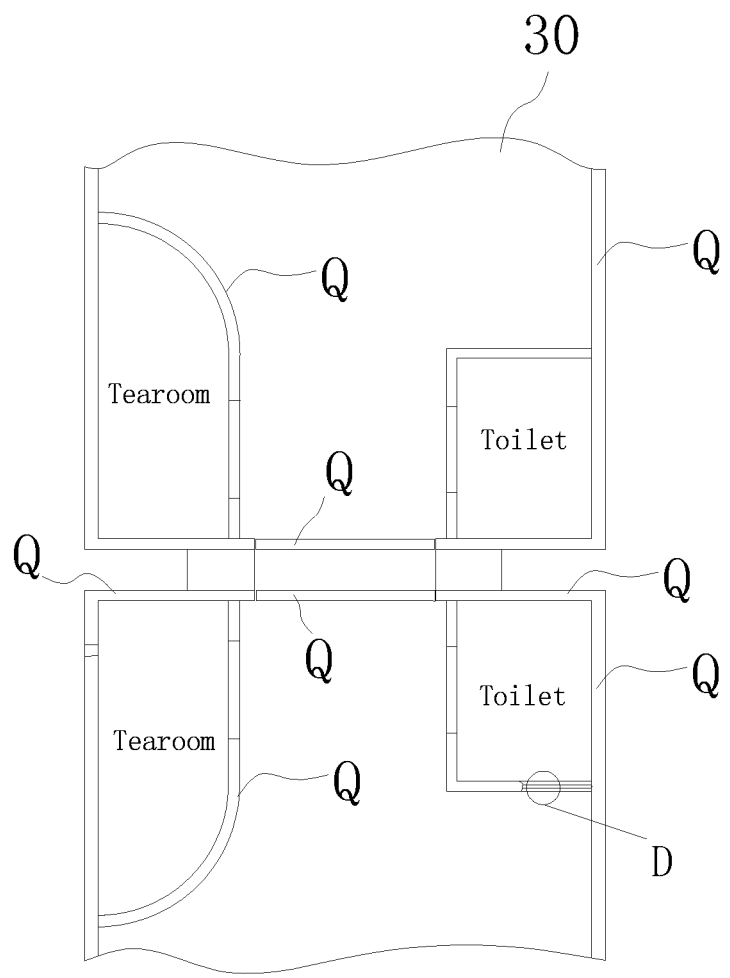
FIG. 8 is a top view according to an embodiment of a sound insulating partition structure of a train carriage of the present application.
Figure 9:
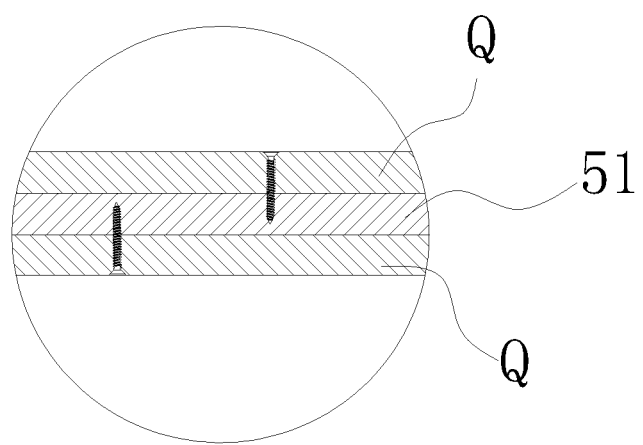
FIG. 9 is a partial enlarged view of part D in FIG. 8.

In other embodiments, as shown in FIGS. 3 to 5, a plurality of recessed portions 11 and a plurality of bosses 12 are provided on the edge of the sound insulating plate Q. Wherein, the bosses 12 have the same shape as the recessed portions 11, and are disposed at intervals. Further, the recessed portions 11 on opposite ends of the same sound insulating plate Q are recessed in opposite directions, and the bosses 12 protrude in opposite directions. The boss 12 and the recessed portion 11 of two adjacent sound insulating plates Q match with each other, and the thickness thereof is equal to the thickness of the sound insulating plate Q. Two adjacent sound insulating plates Q (sound insulating plates Q A and sound insulating plates Q B respectively) during installation, wherein the boss 12 of the sound insulating plate Q A and the recessed portion 11 of the sound insulating plate Q B fit with each other, and the boss 12 of the sound insulating plate Q B and the recessed portion 11 of the sound insulating plate Q A fit with each other. The thickness of the fitted boss 12 and the recessed portion 11 is equal to the thickness of the sound insulating plate Q, so that the joint of the two sound insulating plates Q is prevented from forming a concave-convex structure. At the same time, the recessed portion 11 and the boss 12 of the two sound insulating plates Q are sealed to each other for better sound insulation effect.

In other embodiments, if two sound insulating plates Q are combined, a plurality of sound absorbing grooves are provided on opposite sides on the inner sides of the sound insulating plates Q, wherein the sound absorbing grooves can be arranged laterally or vertically. The sound absorbing grooves may be rectangular grooves, U-shaped grooves, V-shaped grooves, W-shaped grooves or dovetail grooves. Preferably, both sides of the sound insulating plate Q are provided with sound absorbing grooves.

A sound insulating fireproof wall structure, as shown in FIG. 6 to FIG. 9, includes a wall body 30, and the above-mentioned sound insulating plate Q; wherein, a plurality of sound insulating plates Q are joined to each other and fixedly coupled to an inner wall of the wall body 30 to form a sound insulating fireproof wall structure. Wherein, when the inner wall of the wall body 30 is a straight surface, the sound insulating structure is formed by joining a plurality of straight sound insulating plates Q; when the inner wall of the wall body 30 is a curved surface, the sound insulating structure is formed by joining a plurality of curved sound insulating plates Q.

In particular, the sound insulating fireproof wall structure of the present application is suitable for applying to high-speed rail, trains, etc., and the wall body 30 is the inner wall of the carriage. High-speed rail, trains and the like will generate large noise during operation. After testing, the sound insulating fireproof wall structure of the present application can effectively reduce noise, and the noise can be controlled within 40 dB inside the carriage.

Preferably, a decorative layer 40 is further disposed on the inner side of the wall body 30. The sound insulating plate Q is disposed between the inner wall of the wall body 30 and the decorative layer 40 to form a sandwich structure. The decorative layer 40 is made of fireproof material and other materials to have not only decorative function, but also the functions of self-cleaning, fireproofing and sound insulating.

Preferably, the sound insulating plate Q is fixedly coupled to the inner wall of the wall body 30 by a fastener 50, and an adhesive layer 60 for bonding the sound insulating plate Q to the wall body 30 is applied at the contact of sound insulating plate Q with the inner wall of the wall body 30; wherein, the fastener 50 is a fastening bolt, a fastening screw, or the like.

a fixing method: firstly apply adhesive on the inner wall of the wall body 30 or on a side of the sound insulating plate Q, and then pre-fix the sound insulating plate Q on the inner wall of the wall body 30 by the adhesive force of the adhesive, wherein, a bonding layer 60 is formed after the adhesive cures; then, the pre-fixed sound insulating plate Q is locked to the inner wall of the wall body 30 by a fastening bolt to prevent falling off.

A sound insulating partition structure includes a fixing plate 51, and a sound insulating plate Q fixed to one side or both sides of the fixing plate 51. The partition structure is used for partitioning the carriage into a plurality of sections. Wherein, the fixing plate 51 is fixed to the carriage, and the sound insulating plate is fixed thereon, and is generally fixed by using a countersunk screw. The fixing plate 51 functions as a so-called "keel".

In addition, the above-mentioned sound insulating plate Q can be used as a door panel in a carriage or other places, and functions as a sound insulating door.

Figure 10:
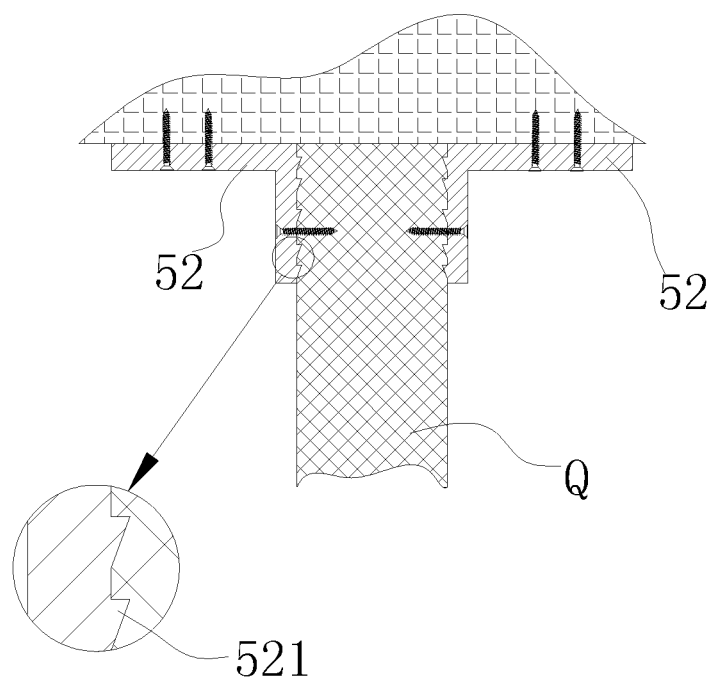
FIG. 10 is a schematic diagram showing fixing means between the sound insulating plate and the carriage according to an embodiment of a sound insulating partition structure of a train carriage of the present application.

In other embodiments, as shown in FIG. 10, fixing between the sound insulating plate Q and the bottom and top of the carriage by means of a connecting member 52 provided is also required. The connecting member 52 is an angled member having one end fixed to the carriage and the other end fixed to the sound insulating plate Q. In order for the connecting member 52 to be more firmly coupled to the sound insulating plate Q, the connecting member 52 is provided with projections 521 on a side corresponding to the sound insulating plate Q. During fixing process, the connecting member 52 and the sound insulating plate Q are tightened by the countersunk screws so that the projections 521 are trapped in the sound insulating plate.

In summary, in the present application, the mixture of aluminosilicate, alumina and iron oxide forms particles at high temperature; the particles are then mixed with the binder, the clay and the curing agent, and pressed in a specific mold at certain temperature to form a material having good sound insulating and fireproof performance. Wherein, the components of the binder are at least two of lithium silicate, sodium silicate and calcium silicate; and the component of the curing agent is at least one of lithium oxide, magnesium oxide and silica. The sound insulating plate made from the above material has a light weight and the sound insulation amount reaches 35-42 dB. This sound insulating plate is especially used for partitions or partitioning walls of high-speed rail and train carriages. It has been tested to have good sound insulating effect, high impact resistance and environment-friendly and be free of harmful gases and heavy metals. The sound insulating material and products thereof of the present application have good sound insulating effect, low density, high compressive strength and tensile strength and high fire resistance, and, at the same, and are environment-friendly, low-carbon, energy saving and renewable.

The above examples merely further illustrate the technical details of the present application, in order to facilitate easier understanding of the reader, but do not represent embodiments of the present application is limited thereto, any technical extension or re-creation made under the present application falls within the scope of protection of this application.

What is claimed is:

1. A sound insulating material characterized by comprising the following components in weight ratio:
   2-8 parts of tricalcium silicate;
   4-10 parts of calcium hydroxide;
   10-30 parts of aluminosilicates;
   4-10 parts of alumina;
   5-15 parts of iron oxide;
   10-30 parts of a binder;
   5-10 parts of a curing agent;
   wherein the binder is at least two of lithium silicate, sodium silicate, and calcium silicate; and the curing agent is at least one of lithium oxide, magnesium oxide, and silica; and
   a mixture of the aluminosilicate, the alumina and the iron oxide expands and forms into particles at 1000° C.-1350° C.; the particles are mixed with the tricalcium silicate, the calcium hydroxide, the binder and the curing agent and poured into a forming mold, heated and pressurized to form the material.

2. The sound insulating material according to claim 1, characterized by further comprising 5-10 parts of clay in weight ratio.

3. The sound insulating material according to claim 1, characterized in that when the binder is a mixture of lithium silicate and sodium silicate, its components in weight ratio are:
   6-15 parts of lithium silicate;
   5-15 parts of sodium silicate;
   when the binder is a mixture of lithium silicate and calcium silicate, its components in weight ratio are:
   5-10 parts of lithium silicate;
   7-20 parts of calcium silicate;
   when the binder is a mixture of sodium silicate and calcium silicate, its components in weight ratio are:
   7-18 parts of sodium silicate;
   6-12 parts of calcium silicate;
   when the binder is a mixture of lithium silicate, sodium silicate and calcium silicate, its components in weight ratio are:
   1-10 parts of lithium silicate;
   3-10 parts of sodium silicate;
   3-8 parts of calcium silicate.

4. The sound insulating material according to claim 1, characterized in that when the components of the curing agent are a mixture of lithium oxide and magnesium oxide, the components in weight ratio are:
   3-6 parts of lithium oxide;
   2-4 parts of magnesium oxide;
   or when the components of the curing agent are a mixture of lithium oxide and silica, the components in weight ratio are:
   4-7 parts of lithium oxide;
   2-3 parts of silica;
   or when the components of the curing agent are a mixture of magnesium oxide and silica, the components in weight ratio are:
   3-5 parts of magnesium oxide;
   3-5 parts of silica;
   or when the components of the curing agent are a mixture of lithium oxide, magnesium oxide and silica, the components in weight ratio are:
   2-4 parts of lithium oxide;
   2-3 parts of magnesium oxide;
   1-3 parts of silica.

5. The sound insulating material according to claim 1, characterized in that the particles has a diameter of 0.5-12 mm; the material is formed by pressurizing the particles, the tricalcium silicate, the calcium hydroxide, the binder, and the curing agent at 35-60 MPa in a mold cavity at a temperature of 180° C.-245° C., and holding for 50-90 minutes.

6. A sound insulating plate comprising a plate body, characterized in that the plate body comprises the sound insulating material of claim 1.

7. A sound insulating plate comprising a plate body, characterized in that the plate body comprises the sound insulating material of claim 2.

8. A sound insulating plate comprising a plate body, characterized in that the plate body comprises the sound insulating material of claim 3.

9. A sound insulating plate comprising a plate body, characterized in that the plate body comprises the sound insulating material of claim 4.

10. A sound insulating plate comprising a plate body, characterized in that the plate body comprises the sound insulating material of claim 5.

11. The sound insulating plate according to claim 6, characterized in that a protective layer is provided on one side or both sides of the plate body; the plate body has a thickness of 12-35 mm; the protective layer comprises one or more of a metal layer, a wood layer, a plastic layer or a leather layer.

12. The sound insulating plate according to claim 7, characterized in that a protective layer is provided on one side or both sides of the plate body; the plate body has a thickness of 12-35 mm; the protective layer comprises one or more of a metal layer, a wood layer, a plastic layer or a leather layer.

13. The sound insulating plate according to claim 8, characterized in that a protective layer is provided on one side or both sides of the plate body; the plate body has a thickness of 12-35 mm; the protective layer comprises one or more of a metal layer, a wood layer, a plastic layer or a leather layer.

14. The sound insulating plate according to claim 9, characterized in that a protective layer is provided on one side or both sides of the plate body; the plate body has a thickness of 12-35 mm; the protective layer comprises one or more of a metal layer, a wood layer, a plastic layer or a leather layer.

15. The sound insulating plate according to claim 10, characterized in that a protective layer is provided on one side or both sides of the plate body; the plate body has a thickness of 12-35 mm; the protective layer comprises one or more of a metal layer, a wood layer, a plastic layer or a leather layer.

16. A sound insulating partition structure of train carriages, characterized by comprising a wall body and the sound insulating plate of claim 6; wherein a plurality of the sound insulating plates are joined together and fixedly coupled to the wall body to form a fireproof and sound insulating structure.

17. The sound insulating partition structure of train carriages according to claim 8, characterized in that an inner side of the wall body is further provided with a decorative layer; the sound insulating plates are disposed between an inner wall of the wall body and the decorative layer to form a sandwich structure; the sound insulating plates are fixedly coupled with the inner wall of the wall body via a fastener provided, and a bonding layer is provided at a contact region between the sound insulating plates and the inner wall of the wall body.

18. The sound insulating partition structure of train carriages according to claim 16, characterized in that the carriages are provided with a fixing plate, and the sound insulating plates are fixed to one side or both sides of the fixing plate.

* * * * *